United States Patent
Cai et al.

(10) Patent No.: US 10,308,778 B2
(45) Date of Patent: Jun. 4, 2019

(54) PREPARATION AND APPLICATION OF DYNAMIC NON-WICKING PU FOAM

(71) Applicant: Crecimiento Industrial Co., LTD., Taichung (CN)

(72) Inventors: Shaowu Cai, Zhongshan (CN); Xingshu Li, Zhongshan (CN); Wei Zeng, Zhongshan (CN); Zhihong Zeng, Zhongshan (CN); Shizhu Ma, Zhongshan (CN)

(73) Assignee: CRECIMENTO INDUSTRIAL CO., LTD., Taichung (CN)

( * ) Notice: Subject to any disclaimer, the term of this patent is extended or adjusted under 35 U.S.C. 154(b) by 133 days.

(21) Appl. No.: 15/318,558

(22) PCT Filed: Nov. 25, 2014

(86) PCT No.: PCT/CN2014/092099
§ 371 (c)(1),
(2) Date: Dec. 13, 2016

(87) PCT Pub. No.: WO2016/082089
PCT Pub. Date: Jun. 2, 2016

(65) Prior Publication Data
US 2017/0130020 A1 May 11, 2017

(51) Int. Cl.
*C08J 9/00* (2006.01)
*A43B 7/12* (2006.01)
*A43B 23/02* (2006.01)
*C08G 18/24* (2006.01)
*C08G 18/48* (2006.01)
*C08G 18/76* (2006.01)
*A43B 1/10* (2006.01)
*C08G 18/28* (2006.01)
*C08G 101/00* (2006.01)

(52) U.S. Cl.
CPC ............ *C08J 9/0023* (2013.01); *A43B 1/10* (2013.01); *A43B 7/12* (2013.01); *A43B 7/125* (2013.01); *A43B 23/022* (2013.01); *A43B 23/0215* (2013.01); *C08G 18/244* (2013.01); *C08G 18/281* (2013.01); *C08G 18/2825* (2013.01); *C08G 18/2865* (2013.01); *C08G 18/48* (2013.01); *C08G 18/4808* (2013.01); *C08G 18/7621* (2013.01); *C08J 9/0028* (2013.01); *C08J 9/0052* (2013.01); *C08G 2101/0083* (2013.01); *C08J 9/0042* (2013.01); *C08J 2375/08* (2013.01)

(58) Field of Classification Search
CPC .. A43B 1/10; A43B 7/12; A43B 7/125; A43B 23/0215; A43B 23/022; C08G 18/244; C08G 18/281; C08G 18/2825; C08G 18/2865; C08G 18/48; C08G 18/4808; C08G 18/7621; C08G 2101/0083; C08J 9/0023; C08J 9/0028; C08J 9/0042; C08J 9/0052; C08J 2375/08
See application file for complete search history.

(56) References Cited

U.S. PATENT DOCUMENTS

| 6,100,308 A | * | 8/2000 | Guettes | C08G 18/5033 521/131 |
| 7,326,738 B2 | * | 2/2008 | Stearns | C08G 18/10 521/131 |
| 2010/0105789 A1 | * | 4/2010 | Van Horn | C08J 9/146 521/98 |

* cited by examiner

*Primary Examiner* — John M Cooney
(74) *Attorney, Agent, or Firm* — Gokalp Bayramoglu

(57) ABSTRACT

Disclosed are a dynamic non-wicking PU foam and preparation and application thereof The PU foam is prepared from polyether polyol, toluene-2,4-diisocyanate, non-wicking additive and auxiliary agent. The dynamic non-wicking additive is composed of carboxylic acids, amines and alkyl alcohols in any proportion. The auxiliary agent is composed of silicone surfactant, amine promoter, tin catalyst, pigment and water. The dynamic non-wicking PU foam has a high stability and an extremely non-wicking effect. The shoes made of the dynamic non-wicking PU foam also have extremely good dynamic non-wicking and waterproof effects, thus ensuring both comfort and stability of quality.

8 Claims, No Drawings

PREPARATION AND APPLICATION OF DYNAMIC NON-WICKING PU FOAM

FIELD OF THE INVENTION

The present invention is involved in the preparation and application of high-efficient dynamic non-wicking PU foam in the field of shoe materials, and this PU foam can be further used for the production of the upper vanps, tongues and collars of the waterproof shoes.

BACKGROUND OF THE INVENTION

In the field of shoe materials, the dynamic non-wicking PU foam is an important material for the production of waterproof and air-permeable high-grade shoes. At present, the non-wicking PU foam for shoe materials on the market is generally prepared as follows: PU foam is obtained by traditional method, in which the PU foam is subjected to the reprocessing processes, such as soaking with a waterproof agent, then drying, etc. This method suffers from complicated process, high energy consumption and non-uniformity in the non-wicking effects due to the instable process, and also this process thus seriously affects the product quality of the material for preparing the waterproof non-wicking shoes.

SUMMARY OF THE INVENTION

In view of the above-mentioned deficiencies of the prior art, the primary goal of the present invention is to provide a dynamic non-wicking PU foam with excellent stability, wherein the formulation of the PU foam preparation consists of various dynamic non-wicking additives such as carboxylic acids, amines or alcohols with hydrophobic alkyl groups. During the foaming process, carboxylic acids, amines or alcohols react with the isocyanate to form the corresponding amides, alkyl-substituted ureas and carbamates. The alkyl group in the carboxylic acid, alcohol and amine molecule is employed as the hydrophobic group in the side chain to shield the hydrophilic group in the main chain, so that the whole molecule has good waterproof and non-wicking effects.

Another goal of the present invention is to provide a method for preparing the above-mentioned high-efficient dynamic non-wicking PU foam.

Yet another object of the present invention is to provide use of the abovementioned high-efficient dynamic non-wicking PU foam.

The goals of the present invention are achieved by the following technical solutions:

Dynamic non-wicking PU foam is prepared from the following components by weight percentage:

Polyether polyols: 62.6-75.4%
Diisocyanates: 15.9-26.2%
Dynamic non-wicking additives: 5.6-7.2%
Auxiliary agents: 3.1-4.0%;

wherein the polyether polyols are composed of 27-75% of Polyether polyol 5615 and 25-73% of Polyether polyol 3045; all of the percentages are based on the total weight of the polyether polyols.

Diisocyanate is preferably toluene-2,4-diisocyanate T-80.

The dynamic non-wicking additive is one of carboxylic acids, amines or alkyl alcohols, and can be composed of carboxylic acids, amines, and alkyl alcohols in any proportion.

Preferably, the dynamic non-wicking additive is composed of the following components by weight percentage:

Carboxylic acids: 18.8-38.6%
Amines: 29.6-34.4%
Alkyl alcohols: 31.8-46.8%;

wherein the carboxylic acids, amines, or alkyl alcohols contain 8 to 20 carbon atoms, preferably 11-16 carbon atoms, and have a straight or branched chain structure.

The auxiliary agent is composed of the following components by weight percentage:

Silicone surfactant: 18.8-33.2%
Amine promoter 3.1-7.6%
Tin catalyst 3.2-7.3%
Pigment: 20.4-24.8%
Water: 35.6-46.0%;

wherein the silicone surfactant is preferably silicone surfactant L-618.

The amine promoter is composed of triethylene diamine and dipropylene glycol.

The tin catalyst is preferably stannous octoate T-9.

The method for preparing the above-mentioned dynamic non-wicking PU foam comprises the following steps:

(1) Premixing: the polyether polyols, the dynamic non-wicking additives and the auxiliary agents are mixed and stirred to uniform;

(2) High speed mixing: the diisocyanates are added to the mixture obtained in the step (1), stirred in high speed to uniform; and placed at room temperature for 1-3 days to obtain the dynamic non-wicking PU foam;

in the step (2), the high-speed stirring has a rotation speed of 2500-6000 revolutions/minute, preferably 5000 revolutions/minute;

in step (2), after the mixture solution is stirred in high speed, three stages of change will occur, in the first stage, the mixture solution occurs emulsifying and whiting phenomena, lasting for 8-20 seconds; the second stage is a foaming stage, with a foaming time of 30-300 seconds, in this stage, the mixed liquid is gradually changed from liquid to solid, and forming a foam with a certain rigid strength; and the third stage is a curing stage, the curing is carried out at room temperature for 1-3 days.

In the preparation process, throughout the foaming process, the auxiliary agents play the roles of accelerating the reaction, stabilizing the foam growth, regulating the organization uniform and fine, and making the prepared PU foam having dynamic waterproof and non-wicking effects via reaction.

The above-mentioned dynamic non-wicking PU foam can be used for the production of the upper vanps, tongues, and collars of the waterproof shoes.

The principle of the present invention is that during the foaming process, the carboxylic acids, the amines or alcohols react with the isocyanates to form the corresponding amides, alkyl-substituted ureas and carbamates. And the alkyl group in the carboxylic acid, alcohol, and amine molecules is used as the hydrophobic group in the side chain to shield the hydrophilic group in the main chain, so that the whole molecule has good waterproof and non-wicking effects.

The scheme of preparing non-wicking PU foam is shown as follows:

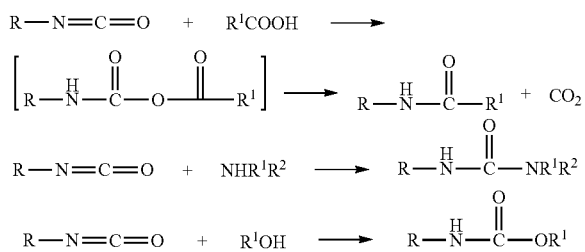

wherein R is a polyurethane chain in the PU foam, $R^1$ and $R^2$ are alkyl groups having a certain carbon chain length. The whole PU foam product has excellent dynamic non-wicking property just due to the hydrophobic property and the shielding effect of the carbon chain. The various components in the dynamic non-wicking additive in the present invention may be used solely or in combination.

Compared with the prior art, the present invention has the following advantages and effects.

The dynamic non-wicking PU foam disclosed in the present invention has high stability and excellent non-wicking effect. The shoes made of the dynamic non-wicking PU foam have good dynamic non-wicking water-proof effect, thus ensuring both comfort and stability of quality.

DETAILED DESCRIPTION OF THE INVENTION

The present invention is further described in detail below in combination with the examples, but the embodiments of the present invention are not limited thereto.

In the examples of the present invention, the method for preparing the dynamic non-wicking PU foam comprises the following steps:

(1). Premixing: the polyether polyols, the dynamic non-wicking additives and the auxiliary agents are mixed, and stirred to uniform;

(2) High speed mixing: the toluene-2,4-diisocyanate is added to the mixture obtained in step (1), stirred in high speed (5000 revolutions per minute) to uniform; and placed at room temperature for 1-3 days, so as to obtain the dynamic non-wicking PU foam.

EXAMPLE 1

The formulation of the dynamic non-wicking PU foam I is shown in the following table:

| Components | Weight percentage |
| --- | --- |
| Polyether polyol | 62.6% |
| Toluene-2,4-diisocyanate T-80 | 26.2% |
| Dynamic non-wicking additive | 7.2% |
| Auxiliary agent | 4.0% | wherein the polyether polyol is composed of 75% of Polyether polyol 5615 and 25% of Polyether polyol 3045, all of the percentages are based on the total weight of the polyether polyols.

The dynamic non-wicking additive has the components as shown in the following table:

| Components | Weight percentage |
| --- | --- |
| Dodecyl carboxylic acid | 38.6% |
| Tetradecyl amine | 29.6% |
| 6-undecanol | 31.8% |

The auxiliary agent has the components as shown in the following table

| Components | Weight percentage |
| --- | --- |
| Silicone surfactant L-618 | 18.8% |
| Amine promoter | 3.1% |
| Tin catalyst (Stannous octanoate T-9) | 7.3% |
| Black pigment | 24.8% |
| Water | 46.0% |

Note: the silicone surfactant L-618 is purchased from MOMENTIVE Company, U.S.A. (similarly hereinafter).

wherein the amine promoter is composed of triethylene diamine and dipropylene glycol.

The non-wicking test of the PU foam I is performed according to the method specified by GORE-TEX, obtaining a dynamic non-wicking performance of 210000 times. However, the control product, i.e., the conventional PU foam without addition of the dynamic non-wicking additive (which is obtained using the same formulation and method as those in this example, except that the dynamic non-wicking additive is not added), obtaining a dynamic non-wicking performance of 300 times or less.

EXAMPLE 2

The formulation of dynamic non-wicking PU foam II is shown in the following table:

| Components | Weight percentage |
| --- | --- |
| Polyether polyol | 68.3% |
| Toluene-2,4-diisocyanate T-80 | 22.2% |
| Dynamic non-wicking additive | 6.0% |
| Auxiliary agent | 3.5% | wherein the polyether polyol is composed of 42% of Polyether polyol 5615 and 58% of Polyether polyol 3045, all of the percentages are based on the total weight of the polyether polyols.

The dynamic non-wicking additives are shown in the following table:

| Components | Weight percentage |
| --- | --- |
| Tetradecyl carboxylic acid | 18.8% |
| Dodecyl amine | 34.4% |
| 1-undecanol | 46.8% |

The auxiliary agent has the components as shown in the following table

| Components | Weight percentage |
| --- | --- |
| Silicone surfactant L-618 | 27.9% |
| Amine promoter | 4.3% |
| Tin catalyst (Stannous octanoate T-9) | 5.8% |

-continued

| Components | Weight percentage |
|---|---|
| Black pigment | 21.4% |
| Water | 40.6% | wherein the amine promoter is composed of triethylene diamine and dipropylene glycol.

The non-wicking test of the PU foam his performed according to the method specified by GORE-TEX, obtaining a dynamic non-wicking performance of 180000 times. However, the control product, i.e., the conventional PU foam without addition of the dynamic non-wicking additive (which is obtained using the same formulation and method as those in this example, except that the dynamic non-wicking additive is not added), obtaining a dynamic non-wicking performance of 300 times or less.

EXAMPLE 3

The formulation of dynamic non-wicking PU foam III is shown in the following table:

| Components | Weight percentage |
|---|---|
| Polyether polyol | 75.4% |
| Toluene-2,4-diisocyanate T-80 | 15.9% |
| Dynamic non-wicking additive | 5.6% |
| Auxiliary agent | 3.1% | wherein the polyether polyol is composed of 27% of Polyether polyol 5615 and 73% of Polyether polyol 3045, all of the percentages are based on the total weight of the polyether polyols.

The dynamic non-wicking additive has the components as shown in the following table:

| Components | Weight percentage |
|---|---|
| Hexadecyl carboxylic acid | 25.0% |
| Tetradecyl amine | 30.5% |
| 1-dodecanol | 44.5% |

The auxiliary agents are shown in the following table

| Components | Weight percentage |
|---|---|
| Silicone surfactant L-618 | 33.2% |
| Amine promoter | 7.6% |
| Tin catalyst (Stannous octanoate T-9) | 3.2% |
| Black pigment | 20.4% |
| Water | 35.6% | wherein the amine promoter is composed of triethylene diamine and dipropylene glycol.

The non-wicking test of the PU foam III is performed according to the method specified by GORE-TEX, obtaining a dynamic non-wicking performance of 165000 times. However, the control product, i.e., the conventional PU foam without addition of the dynamic non-wicking additive (which is obtained using the same formulation and method as those in this example, except that the dynamic non-wicking additive is not added), obtaining a dynamic non-wicking performance of 300 times or less.

EXAMPLE 4

A dynamic non-wicking PU foam IV is shown in the following table:

| Components | Weight percentage |
|---|---|
| Polyether polyol | 75.4% |
| Toluene-2,4-diisocyanate T-80 | 15.9% |
| Dynamic non-wicking additive (6-undecanol) | 5.6% |
| Auxiliary agent | 3.1% | wherein the polyether polyol is composed of 27% of Polyether polyol 5615 and 73% of Polyether polyol 3045, all of the percentages are based on the total weight of the polyether polyols.

The auxiliary agents are shown in the following table

| Components | Weight percentage |
|---|---|
| Silicone surfactant L-618 | 33.2% |
| Amine promoter | 7.6% |
| Tin catalyst (Stannous octanoate T-9) | 3.2% |
| Black pigment | 20.4% |
| Water | 35.6% | wherein the amine promoter is composed of triethylene diamine and dipropylene glycol.

The non-wicking test of the PU foam IV is performed according to the method specified by GORE-TEX, obtaining a dynamic non-wicking performance of 60000 times. However, the control product, i.e., the conventional PU foam without addition of the dynamic non-wicking additive (which is obtained using the same formulation and method as those in this example, except that the dynamic non-wicking additive is not added), obtaining a dynamic non-wicking performance of 300 times or less.

EXAMPLE 5

The formulation of dynamic non-wicking PU foam V is shown in the following table:

| Components | Weight percentage |
|---|---|
| Polyether polyol | 75.4% |
| Toluene-2,4-diisocyanate T-80 | 15.9% |
| Dynamic non-wicking additive (Tetradecyl amine) | 5.6% |
| Auxiliary agent | 3.1% | wherein the polyether polyol is composed of 27% of Polyether polyol 5615 and 73% of Polyether polyol 3045, all of the percentages are based on the total weight of the polyether polyols.

The auxiliary agents are shown in the following table

| Components | Weight percentage |
|---|---|
| Silicone surfactant L-618 | 33.2% |
| Amine promoter | 7.6% |
| Tin catalyst (Stannous octanoate T-9) | 3.2% |
| Black pigment | 20.4% |
| Water | 35.6% | wherein the amine promoter is composed of triethylene diamine and dipropylene glycol.

The non-wicking test of the PU foam V is performed according to the method specified by GORE-TEX, obtaining a dynamic non-wicking performance of 80000 times. However, the control product, i.e., the conventional PU foam without addition of the dynamic non-wicking additive (which is obtained using the same formulation and method as those in this example, except that the dynamic non-wicking additive is not added), obtaining a dynamic non-wicking performance of 300 times or less.

EXAMPLE 6

The formulation of dynamic non-wicking PU foam VI is shown in the following table:

| Components | Weight percentage |
|---|---|
| Polyether polyol | 75.4% |
| Toluene-2,4-diisocyanate T-80 | 15.9% |
| Dynamic non-wicking additive (Hexadecyl carboxylic acid) | 5.6% |
| Auxiliary agent | 3.1% | wherein the polyether polyol is composed of 27% of Polyether polyol 5615 and 73% of Polyether polyol 3045, all of the percentages are based on the total weight of the polyether polyols.

The auxiliary agents are shown in the following table

| Components | Weight percentage |
|---|---|
| Silicone surfactant L-618 | 33.2% |
| Amine promoter | 7.6% |
| Tin catalyst (Stannous octanoate T-9) | 3.2% |
| Black pigment | 20.4% |
| Water | 35.6% | wherein the amine promoter is composed of triethylene diamine and dipropylene glycol.

The non-wicking test of the PU foam VI is performed according to the method specified by GORE-TEX, obtaining a dynamic non-wicking performance of 75000 times. However, the control product, i.e., the conventional PU foam without addition of the dynamic non-wicking additive (which is obtained using the same formulation and method as those in this example, except that the dynamic non-wicking additive is not added), obtaining a dynamic non-wicking performance of 300 times or less.

The above-mentioned examples are the preferred embodiments of the present invention, but the embodiments of the present invention are not limited thereto. Any other changes, such as modifications, substitutions, combinations, and simplification should be in the equivalent replacement mode, without departing from the spirit and principle of the present invention, and be all embraced in the scope of protection of the present invention.

What is claimed is:

1. A dynamic non-wicking polyurethane (PU) foam, wherein the dynamic non-wicking polyurethane (PU) foam is prepared from the following components by weight percentage on the basis of the total dynamic non-wicking polyurethane (PU) foam:
   Polyether polyol: 62.6-75.4%,
   Diisocyanate: 15.9-26.2%,
   Dynamic non-wicking additive: 5.6-7.2%, and
   Auxiliary agent: 3.1-4.0%;
   wherein the dynamic non-wicking additive is one of (i) carboxylic acids, (ii) amines or (iii) alkyl alcohols, or (iv) is composed of carboxylic acids, amines, and alkyl alcohols in any proportion, wherein the carboxylic acids and the amines contain alkyl groups having a total of 8-20 carbon atoms, and the alkyl alcohols contain alkyl groups having a total of 11-20 carbon atoms; and
   the auxiliary agent is composed of the following components by weight percentage on the basis of the total auxiliary agent:
   Silicone surfactant: 18.8-33.2%,
   Amine promoter: 3.1-7.6%,
   Tin catalyst: 3.2-7.3%,
   Pigment: 20.4-24.8 %, and
   Water: 35.6-46.0%.

2. The dynamic non-wicking PU foam of claim 1, wherein the diisocyanate is toluene-2,4-diisocyanate.

3. The dynamic non-wicking PU foam of claim 1, wherein the dynamic non-wicking additive is composed of the following components by weight percentage on the basis of the total dynamic non-wicking additive:
   carboxylic acids: 18.8-38.6%
   amines: 29.6-34.4%
   alkyl alcohols: 31.8-46.8%.

4. The dynamic non-wicking PU foam of claim 1, wherein the amine promoter is composed of triethylene diamine and dipropylene glycol.

5. The dynamic non-wicking PU foam of claim 1, wherein the tin catalyst is stannous octoate.

6. A method for preparing the dynamic non-wicking PU foam of claim 1, comprising the steps of:
   (1) premixing the polyether polyol, the dynamic non-wicking additive and the auxiliary agent and stirring until a uniform mixture is made;
   (2) adding the diisocyanate which comprises toluene-2,4-diisocyanate to the mixture obtained in step (1);
   (3) stirring at a rotation speed of 2500-6000 revolutions per minute until a uniform mixture is made; and
   (4) placing the mixture at room temperature for 1-3 days to obtain the dynamic non-wicking PU foam.

7. The method of claim 6, wherein, in step (2), stirring is accomplished at a rotation speed of 5000 revolutions per minute.

8. A method of preparing the upper vamps, tongues, and collars of waterproof shoes comprising forming the upper vamps, tongues, and collars of waterproof shoes from the dynamic non-wicking PU foam of claim 1.

* * * * *